July 5, 1927.
J. O. B. JACOBSEN
1,634,289
EDUCATIONAL APPARATUS
Filed Sept. 13, 1926
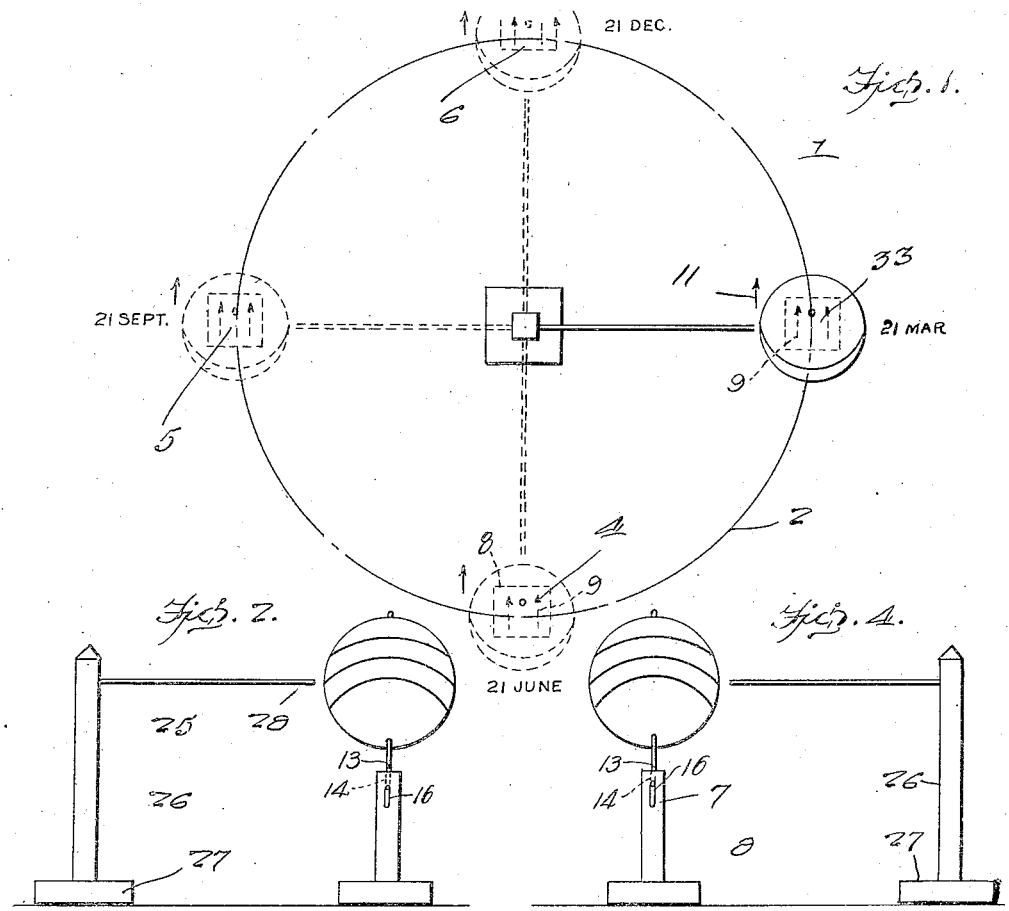
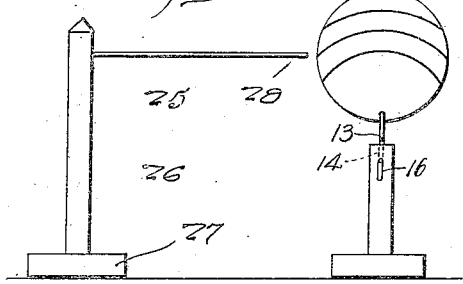
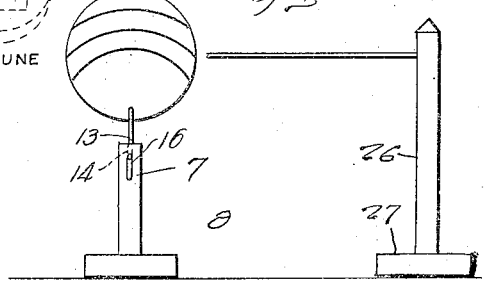
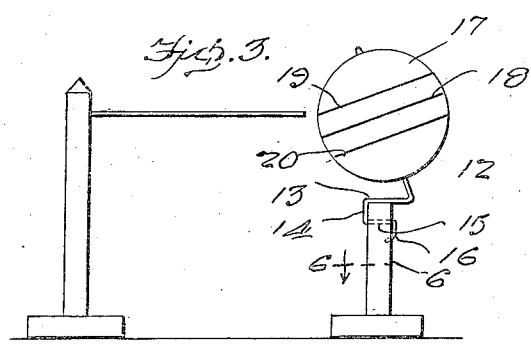
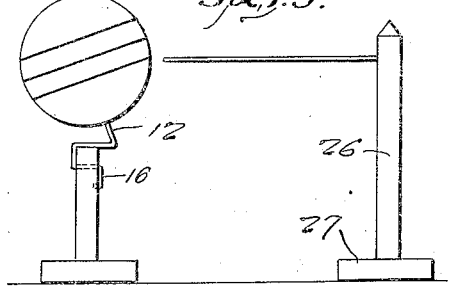
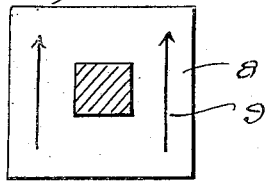
Inventor
J. O. B. Jacobsen
By Clarence A. O'Brien
Attorney Patented July 5, 1927.

1,634,289

UNITED STATES PATENT OFFICE.

JENS OLAI BERNHARD JACOBSEN, OF BELLINGHAM, WASHINGTON.

EDUCATIONAL APPARATUS.

Application filed September 13, 1926. Serial No. 135,103.

My present invention pertains to educational apparatus, and has for its object the provision of a simple, inexpensive and easily manipulated apparatus for exemplifying some of the phenomena of the solar system.

Other objects and practical advantages of the invention will be fully understood from the following description and claim when the same are read in connection with the drawings, accompanying and forming part of this specification, in which:—

Figure 1 is a plan view illustrating my novel apparatus complete.

Figure 2 comprises enlarged disconnected views of the elements representing the sun and the earth, respectively, as the same are arranged on the twenty-first day of March.

Figure 3 shows the same elements as they appear on the twenty-first day of June.

Figure 4 illustrates the elements as they appear on the twenty-first day of September.

Figure 5 shows said elements as they appear on the twenty-first day of December.

Figure 6 is an enlarged horizontal section taken in the plane indicated by the line 6—6 of Figure 3, looking downwardly and showing the arrows on the base of the standards by which the globe simulating the earth is carried.

Similar numerals of reference designate corresponding parts in all of the views of the drawings.

Among other elements my novel apparatus comprises a board or any other appropriate surface, designated by 1, upon which is provided a circle 2, designed to indicate the course of the earth about the sun. At four equi-distant points the circle 2 is provided with a respective mark designated by 3, 4, 5 and 6, respectively. It will also be noticed that the board 1 is provided opposite the marks with inscriptions which read as shown to indicate the twenty-first of March, the twenty-first of June, the twenty-first of September, and the twenty-first of December, respectively.

The globe element hereinafter described is shown in position at 33.

For use on the circle 2 and in association with the several equi-distant marks alluded to, I provide the device shown in Figures 2 to 5. The said device comprises a stand 7 having a base 8, and the said base 8 is provided as designated by 9 and shown in Figure 6 with one or more arrows designed to be placed in parallelism with the arrows 11 on the board 1, and the said arrows 9 being pointed in the same direction as the arrows 11, with a view to contributing to the ready placing of the globe elements in correct positions. In addition to the stand 7, the globe elements comprise an axis member 12, formed by preference of wire, and disposed at the proper angle with reference to the circle and having a horizontal portion 13 superposed on the upper end of the stand, and also having a vertical portion 14 which bears against one side of the stand and terminates in an arm 15 which penetrates the stand, whereby the axis member 12 is strongly connected of itself to the stand and this without the assistance of any extraneous elements. In this latter connection it will be understood that the terminal portion 15 extends transversely through the stand 8 and has a pendent portion 16 which may be and preferably is embedded to a slight extent in the side of the stand so as to contribute to the rigidity of the connection between the axis member 12 and the stand and the maintenance of the axis member 12 at all times in correct position.

The globe element of my improvement also comprises a revoluble globe 17, designed to simulate the earth. Manifestly within the purview of my invention the globe member 17 may be formed of any material compatible with its purpose, and in furtherance of my invention the said globe member is free to rotate about the axis member 12. Also in furtherance of my invention the globe member 17 is provided with a belt or circumferential line designated by 18 and representing the Equator of the earth, and above and below the circumferential line 18 the globe member 17 is provided with tropics 19 and 20.

My novel apparatus also comprises an element designed to represent the sun, the said element being designated by 25 and being made up of a stand 26, including a base 27, and a horizontal arm or pointer 28 carried by the upper portion of the stem and extending laterally therefrom. The said element 25 is designed to be positioned upon the board or other surface 1 and in the center of the circle 2 as appears in Figure 1.

The element 25 representing the sun is preferably superposed upon the board or other surface equipped with the circle 2, and is adapted to be moved about the axis of its stand 26. The globe element of the improvement is also superposed on the board 1, and is capable of being moved about on the board, the only necessary movement of the globe element in accordance with my invention, however, being in the line of the circle 2.

In the practical use of my novel apparatus, it will be understood that when the pointer 28 of the element 25 and the globe element are arranged as shown by full lines in Figure 1 and as also shown in Figure 2, the pointer 28 will be directed toward the Equator line 18 of the globe 17, thereby indicating the portion of the earth subjected to the direct rays of the sun on the twenty-first day of March. When it is desired to exemplify the portion of the earth subjected to the direct rays of the sun on the twenty-first of June, the globe element is moved to a position above the marker 4, Figure 1, and the sun element 25 is turned so that its pointer 28 is nearest to the line of latitude 19 spaced above the Equator line 18, Figure 3. When it is desired to exemplify the portion of the earth subjected to the direct action of the sun rays on the twenty-first day of September, the globe element and the sun element are relatively arranged as shown at the left of Figure 1 in dotted lines and as also shown by full line in Figure 4. The positions in which the sun element and the globe element are placed on the twenty-first day of December are shown in full lines in Figure 5, and in dotted lines at the top of Figure 1, and in this arrangement it will be noticed that the pointer 28 of the sun element has its extremity nearest to the latitude line 20 spaced below the Equator line 18.

In all positions of the globe element as pointed out in the foregoing, it is important that the arrows 9 of the globe element be in parallelism with and extend in the same direction as the arrows 11 provided on the board or other surface 1.

It will be apparent from the foregoing that my novel apparatus is extremely simple and inexpensive in construction, and is susceptible of being conveniently manipulated, and when so manipulated is calculated to excite the interest and hold the attention of the children in a class.

While I prefer for the reasons indicated to employ the specific construction illustrated and described, I do not desire to be understood as confining myself to the precise construction disclosed, my invention being defined by my appended claim within the scope of which modifications may be made without departure from my invention.

Having described my invention, what I claim and desire to secure by Letters-Patent, is:—

Apparatus for exemplifying some of the phenomena of the solar system, comprising a board having on the surface thereof a circle and four equi-distant marks associated with the circle and further having arrows adjacent to said marks, an element designed to represent the sun and having a stand adapted to be placed in the center of the circle and on the board and turnable about its axis, and a horizontal arm carried by and extending laterally of the said stand, and an element designed to simulate the earth and having a globe and also having a stand movable on said board and said stand including a base upon the upper side of which is an arrow pointed in the same direction as the first named arrows and designed to be placed in parallelism therewith.

In testimony whereof I affix my signature.

Mr. JENS OLAI BERNHARD JACOBSEN.